(12) United States Patent
Brueckel

(10) Patent No.: US 10,327,294 B2
(45) Date of Patent: Jun. 18, 2019

(54) VOLTAGE-DEPENDENT CONNECTION OF INDIVIDUAL LIGHT SOURCES

(71) Applicant: OSRAM GmbH, Munich (DE)

(72) Inventor: Martin Brueckel, Karlsruhe (DE)

(73) Assignee: Osram GmbH, Munich (DE)

( * ) Notice: Subject to any disclaimer, the term of this patent is extended or adjusted under 35 U.S.C. 154(b) by 0 days.

(21) Appl. No.: 15/747,770

(22) PCT Filed: Jun. 15, 2016

(86) PCT No.: PCT/EP2016/063681
§ 371 (c)(1),
(2) Date: Jan. 26, 2018

(87) PCT Pub. No.: WO2017/021041
PCT Pub. Date: Feb. 9, 2017

(65) Prior Publication Data
US 2018/0227994 A1    Aug. 9, 2018

(30) Foreign Application Priority Data

Aug. 5, 2015 (DE) .................. 10 2015 214 939

(51) Int. Cl.
*H05B 33/08* (2006.01)
*H05B 37/02* (2006.01)

(52) U.S. Cl.
CPC ..... *H05B 33/0827* (2013.01); *H05B 33/0812* (2013.01); *H05B 33/0824* (2013.01); *H05B 37/02* (2013.01); *Y02B 20/343* (2013.01)

(58) Field of Classification Search
None
See application file for complete search history.

(56) References Cited

U.S. PATENT DOCUMENTS

2009/0184663 A1    7/2009 Reinle
2010/0231133 A1    9/2010 Lys
(Continued)

FOREIGN PATENT DOCUMENTS

DE          4121855 A1    1/1993
DE    102007006438 A1    8/2008
(Continued)

OTHER PUBLICATIONS

German Search Report based on Application No. 10 2015 214 939.0 (7 pages) dated Feb. 16, 2016 (for reference purpose only).
(Continued)

*Primary Examiner* — Douglas W Owens
*Assistant Examiner* — Jianzi Chen
(74) *Attorney, Agent, or Firm* — Viering, Jentschura & Partner MBB

(57) ABSTRACT

A method for operating a lighting device having multiple light sources may include determining a measure of a supply voltage and switching the light sources into one or more parallel strands, wherein the light sources in each strand are connected in series, in each case according to the measured value of the supply voltage. Automatic determination of a number of light sources in at least one of the strands, the number corresponding to the largest whole number which, when multiplied by a specifiable forward voltage of each of the light sources, is less than the measured value of the supply voltage. During switching of the light sources the exact number of light sources determined in the at least one strand is connected in series.

11 Claims, 1 Drawing Sheet

(56) References Cited

U.S. PATENT DOCUMENTS

| | | |
|---|---|---|
| 2013/0015773 A1 | 1/2013 | Tai et al. |
| 2013/0328491 A1 | 12/2013 | Chou et al. |
| 2014/0159593 A1* | 6/2014 | Chu .................... H05B 33/083 |
| | | 315/191 |
| 2014/0218953 A1 | 8/2014 | Ungru |

FOREIGN PATENT DOCUMENTS

| | | |
|---|---|---|
| DE | 102013201766 A1 | 8/2014 |
| WO | 2008017467 A1 | 2/2008 |
| WO | 2012095680 A1 | 7/2012 |

OTHER PUBLICATIONS

International Search Report bases on Application No. PCT/EP2016/063681 (6 pages + 3 pages English Translation) dated Aug. 19, 2016 (for reference purpose only).

* cited by examiner

VOLTAGE-DEPENDENT CONNECTION OF INDIVIDUAL LIGHT SOURCES

RELATED APPLICATIONS

The present application is a national stage entry according to 35 U.S.C. § 371 of PCT application No.: PCT/EP2016/063681 filed on Jun. 15, 2016, which claims priority from German application No.: 10 2015 214 939.0 filed on Aug. 5, 2015, and is incorporated herein by reference in its entirety.

TECHNICAL FIELD

The present disclosure relates to a method for operating a lighting device having multiple light sources, by measuring a supply voltage and switching the light sources into one or more parallel strands, wherein the light sources in each strand are connected in series, in each case depending on the measured supply voltage. In addition, the present disclosure relates to a lighting device having multiple light sources, a measuring device for measuring a supply voltage, and a switching device for switching the light sources into one or more parallel strands, wherein the light sources in each strand are connected in series, in each case depending on the measured supply voltage. The present disclosure also relates to a motor vehicle having such a lighting device.

BACKGROUND

Lighting devices for motor vehicles usually have LED or laser diodes and current drivers. Various implementation options exist for lighting devices of this kind. On the one hand, a discrete structure consisting of diodes and driver blocks in one or more sub-modules can be selected and secondly, fully integrated circuits can also be selected. In addition, mixed solutions with discrete and fully integrated circuit elements are also possible.

Lighting facilities, in particular those used in the automotive field, are subject to specific constraints. Thus, they are usually expected to be both inexpensive and compact. In addition though, they must also be robust and should cause as little electromagnetic interference as possible.

Drivers of lighting devices in the automotive field must be able to be operated in on-board networks of motor vehicles. These typically vary between 9 and 16 V. Depending on the particular active consumers, the battery or on-board power supply voltage can collapse to a varying extent. Particularly salient in this regard is the on-board power supply voltage, for example, when operating the ignition or starter. At the output of the driver, either a constant current or a current which is controlled as a function of input variables must be delivered at all times.

Examples of suitable drivers are switched DC/DC converters. These are usually relatively complex and include a housing and appropriate cabling, which can be relatively space-consuming. Due to the switched-mode operation, EMC protection is additionally required, which also increases the costs of the driver. Their advantage, however, is that the electrical losses are usually small. These are equal to around 10% of the output power, for example. When operating two light-emitting diodes, for example, which each have a forward voltage of 3.5 V and are supplied with a current of 1 A, the power loss is given by $P_V = 2 \times 3.5 V \times 1 A \times 10\% = 0.7$ W. Due to their low loss, the switched converters are used in particular for light sources with high luminous flux, e.g. dipped-beam and main beam lights.

Alternatively, linear regulators or so-called resistance regulators (series resistor in series with an LED across a voltage source) are now widely used as a cost-effective solution with lower requirements. They cause relatively low levels of electromagnetic interference. At present, however, their scope is limited by their high power losses, which is given by the product of output current and voltage drop. If the two LEDs mentioned above are operated on an on-board network with a supply voltage of 13 V, then the voltage drop across the driver is 13 V−2×3.5 V=6 volts. The power loss is therefore 6 V×1 A=6 W. Nevertheless, it would be desirable to be able to use such resistance and linear regulators, which are smaller, cheaper and cause less interference than switching converters, for lighting equipment, in particular in the automotive sector.

Patent document DE 10 2013 201 766 A1 discloses a lighting device with several semiconductor light sources and a device for operating the semiconductor light sources. The device has switching means, by means of which the semiconductor light sources are divisible into groups for operation with the device. In particular, the sub-division is performed as a function of the on-board supply voltage.

SUMMARY

The task of the present disclosure is to enable a lighting device having a plurality of light sources to be operated on a resistance regulator or linear regulator with minimal losses.

A method for operating a lighting device, which has a plurality of light sources, includes
 determination of a measure of a supply voltage and
 switching of the light sources into one or more parallel strands, wherein the light sources in each strand are connected in series, in each case according to the measured value of the supply voltage, and
 automatic determination of a number of light sources in at least one of the strands, the number corresponding to the largest whole number which, when multiplied by a specifiable forward voltage of each of the light sources, is less than the value of the supply voltage determined, and wherein
 during switching of the light sources in the at least one strand the exact number of light sources determined is connected in series.

In addition, a lighting device is provided according to the present disclosure, having
 a plurality of light sources,
 a determination device for determining a measure of a supply voltage and
 a switching device for switching the light sources into one or more parallel strands, wherein the light sources in each strand are connected in series, in each case according to the measured value of the supply voltage, and having
 a control device for the automatic determination of a number of light sources in at least one of the strands, the number corresponding to the largest whole number which, when multiplied by a specifiable forward voltage of each of the light sources, is less than the measured value of the supply voltage, wherein
 the switching device may be controlled by the control device in such a way that the exact number of light sources determined in the at least one strand is connected in series.

In an advantageous way, at least one of the strands is configured in such a way that the number of its light sources corresponds to the largest integer value which is less than, for example, the ratio of the current on-board power supply voltage, or supply voltage, and the specifiable forward voltage of a light source. The number of light sources may be determined in a purely computational manner, or on the basis of measurements during operation or during an initial calibration. The forward voltage of the entire strand is therefore equal to or slightly less than the supply voltage. If the strand is operated with a linear or resistance driver, then the minimal difference between forward voltage and supply voltage means that only minimal losses occur.

Determination of a measure of the supply voltage may mean a measurement of the supply voltage. Alternatively, a measure or representative value of the supply voltage may also be represented, for example, by a state of a circuit. So, for example, a circuit with voltage reference(s), e.g. using Zener diodes or other types of diode, could be used, which occupies certain switching states as a function of the supply voltage, and these states may be used as control variables. In this case, the supply voltage would not need to be explicitly measured.

The forward voltage of the individual light sources or multiples thereof may be either pre-specified or measured. For example, to simplify the automatic determination of the number of light sources in a strand, it may be defined in advance for a specific operating point. A further optimization with respect to the reduction of losses may be achieved in some cases, however, by the fact that the actual forward voltage of one, a plurality of or all of the light sources, or of a specific strand, is measured and hence a dynamic adjustment to the supply voltage is possible.

All parallel strands may have the same number of light sources in series. As a result, it is possible to use a single driver for all strands.

In a particular embodiment, a minimum voltage value and a maximum voltage value are specified for the supply voltage. A minimum number of light sources is then determined in at least one of the strands, such that the minimum number corresponds to the largest whole number, which when multiplied by the specifiable forward voltage of each of the light sources, is less than the minimum voltage value. Likewise, a maximum number of light sources is determined in at least one of the strands, such that the maximum number corresponds to the largest whole number, which when multiplied by the specifiable forward voltage of each of the light sources, is less than the maximum voltage value. The value selected for the number of light sources is an integer between the minimum number and the maximum number. Due to this definition of a minimum number and a maximum number, it is simple matter to select a whole number of light sources between them. This may be effected, for example, by means of a look-up table in which the measured supply voltage is assigned to a number of light sources.

In an embodiment, the total number of light sources of the lighting equipment corresponds to the ratio of factorial (maximum number) and factorial (minimum number—1). In this way, strands of the same length may always be formed, and it is not necessary to control one or a small number of other light sources separately.

As already indicated above, the minimum difference between the forward voltage of an entire strand and the supply voltage enables the use of linear drivers and resistance drivers, since the losses are minimized.

This, in turn, leads to advantages in terms of space, cost and EMC performance.

Specifically, the lighting device may have a single linear driver or resistance driver for the electrical supply of all the light sources. This leads to further space and cost advantages.

Alternatively, the lighting device may have a separate linear driver or resistance driver for each strand for the electrical supply of the light sources. In this way, it is also possible to divide any arbitrary number of light sources into individual strands and yet to operate them in a relatively loss-reduced manner.

Advantageously, the light sources are light emitting diodes, laser diodes, or modules thereof. Here, a module is understood to mean a fixed assembly with one or a plurality of LEDs or laser diodes.

In an embodiment, a motor vehicle is equipped with at least one of the lighting devices described above. This allows all the advantages of the solution according to the present disclosure in terms of power loss, installation space, robustness and EMC compatibility, to be exploited in motor vehicles where these benefits are of particular importance. This usage is not limited to motor vehicles, but is advantageous anywhere where supply voltages vary, thus in particular in mobile devices, in which the supply voltage is often extremely variable.

The features described above in connection with the method according to the present disclosure can be implemented as functional features in the respective lighting device. Conversely, the properties of a lighting device described as functional features can also be used as respective method steps for the claimed method.

BRIEF DESCRIPTION OF THE DRAWINGS

In the drawings, like reference characters generally refer to the same parts throughout the different views. The drawings are not necessarily to scale, emphasis instead generally being placed upon illustrating the principles of the disclosed embodiments. In the following description, various embodiments described with reference to the following drawings, in which.

DETAILED DESCRIPTION

The embodiments described in more detail below represent preferred embodiments of the present disclosure. It is important to note here that the individual features can be realized not only in the feature combinations described, but also individually or in other technically feasible combinations.

It is intended, for example, to operate a lighting device with a plurality of LEDs in a motor vehicle with the minimum possible losses and radiation emission. In particular, a dipped beam or main beam of the motor vehicle, for example, can be implemented in this way. The LEDs represent all possible types of light sources, especially semiconductor light sources. The reference to a motor vehicle is also purely illustrative, and the disclosure can also be used for other purposes.

It is then desirable to use a linear or resistance driver for the lighting device. These have a relatively simple structure, namely where possible only one resistor in series with the load, or the light sources in the case of a resistance driver. Optionally, the resistance can be temperature-dependent (e.g. PTC or NTC).

Figure 1:
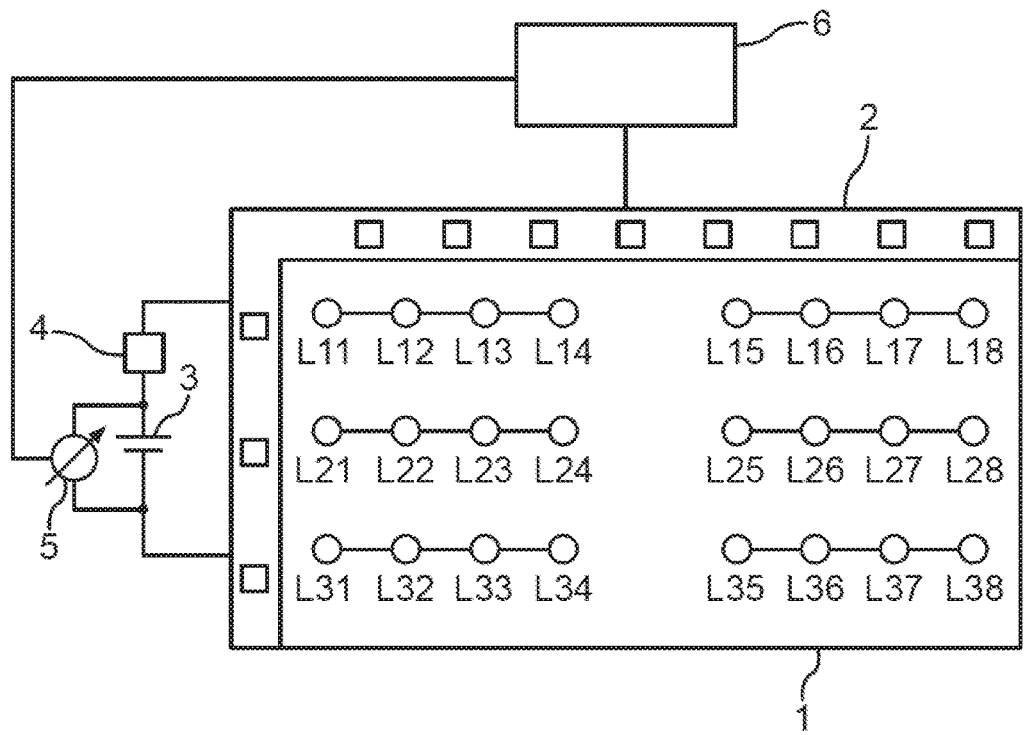
FIG. 1 a block diagram of a lighting device according to the present disclosure.

In a specific example, the lighting device has a matrix of light sources or LEDs, L11, L12, L13, . . . , L18; L21, L22, L23, . . . , L28; L31, L32, L33, . . . , L38, as shown in FIG. 1. These are then designed to be connected to each other depending on the supply voltage, which is supplied, for example, by an on-board power supply. The interconnection should be carried out in such a way that the sum of the series-connected diodes is always equal to or just below the on-board power supply voltage or supply voltage.

In the example of FIG. 1, the matrix 1 of the LEDs is interconnected by a switching device 2. This is capable of connecting a plurality of the LEDs in series to create a strand. Other LEDs are interconnected in groups to form a second, third strand etc. In the example of FIG. 1, six strands are formed, each with four LEDs. A first strand is formed by the LEDs L11 to L14, a second strand by the LEDs L15 to L18, a third strand by the LEDs L21 to L24, a fourth strand by the LEDs L25 to L28, a fifth strand by the LEDs L31 to L34 and a sixth strand by the LEDs L35 to L38. Alternatively, other groups each of four LEDs can also be formed. Thus, for example, the LEDs L11, L21, L31 and L32 can also be connected to form a strand, or a group. The other LEDs can be grouped together in arbitrary ways.

Unlike in the example of FIG. 1, strands with three LEDs, two LEDs, six LEDs, eight LEDs etc. can also be formed. In an extreme case, even a single strand with 24 LEDs can be formed, or else 24 "strands" can be formed with one LED each. In the selected example of 24 LEDs, the following groupings are possible (number of strands×number of LEDs):

24×1
12×2
8×3
6×4
4×6
3×8
2×12
1×24

Instead of the number 24 in the above example, in principle any arbitrary number can be selected for the number of LEDs.

It is advantageous, however, to choose a number of LEDs that allow different strand formations without a remainder, wherein the difference between the strand lengths, at least in a preferred region, is only 1. As the table above shows, in the case of 24 LEDs, strands with 1, 2, 3, and 4 LEDs can be formed, wherein all the LEDs are always in use and all strands are of equal length. Hereafter, the method by which the strands should be formed is derived for the general case. This procedure can involve the following steps:

(a) The forward voltage of each LED, laser diode or other light source in the lighting device can be restricted to a range $U\_LED\_min$ to $U\_LED\_max$ by its specification or a known value range. In the most complex case, the actual voltage is measured and in the simplest case it is specified, or set to a specific value, e.g. $U\_LED=3.5$ V.

(b) The on-board power supply voltage or supply voltage is in a range from $U\_BOARD\_min$ to $U\_BOARD\_max$. Due to the often sharp fluctuations, the on-board power supply voltage should be measured at its current value.

(c) The maximum number of LEDs in series is set to $N\_SERIES\_max=U\_BOARD\_max/U\_LED$ (d) The minimum number of LEDs in series is set to $N\_SERIES\_min=U\_BOARD\_min/U\_LED$ (e) The specific number of LEDs connected in series at a given moment is set to $N\_CURRENT$=the largest integer value that is smaller than $U\_BOARD/U\_LED$.

(f) The number of LEDs in the LED lighting device is preferably chosen in accordance with $N\_LED\_TOTAL=N\_SERIES\_min\times(N\_SERIES\_min+1)\times(N\_SERIES\_min+2)\times\ldots\times N\_SERIES\_max$. In the event that $N\_SERIES\_min=1$, this results in $N\_LED\_TOTAL=N\_SERIES\_max!$, i.e. the factorial of the maximum number of light sources in a series. Otherwise, $N\_LED\_TOTAL=N\_SERIES\_max!/(N\_SERIES\_min-1)!$.

The on-board network is symbolized in FIG. 1 by a battery 3. The LEDs of the lighting device here are operated simply via a resistance driver, in other words a series resistor 4 (alternatively a linear driver could also be used). The respective number of LEDs is connected in series in each of a plurality of strands by the switching device 2 and the strands are connected in parallel with each other. The parallel strands are supplied with current by the resistance driver.

In order to intelligently switch the LEDs to form strands, the supply voltage or on-board power supply voltage is measured by a measuring device 5. The corresponding measuring signal is fed to a control device 6, which automatically determines the number of light sources or LEDs in at least one of the strands, preferably in all strands, wherein the number corresponds to the largest whole number which, multiplied by a specifiable forward voltage (e.g. 3.5 V) of each of the light sources, is less than the measured supply voltage.

The following is a description of a concrete example. The forward voltage of an LED is set to $U\_LED=3.5$V. For the supply voltage range, the two limits $U\_BOARD\_min=9$V and $U\_BOARD\_max=16$V are defined. In the case of an on-board supply voltage of 9 V therefore, just 2 LEDs can be connected in series, so that $N\_SERIES\_min=2$ is obtained. The forward voltage of the two LEDs is then equal to 7 V and is less than 9 V. With the maximum on-board voltage of 16 volts four LEDs can be connected in series, which then lead to a total forward voltage of 14 V, which corresponds to the largest integer value below the maximum on-board voltage of 16 V. In accordance with point f) above, this would give a total number of LEDs $N\_LED\_TOTAL=2\times3\times4=24$. This total number would remain the same even if the on-board power supply voltage were to fall below 7 V, and in that case a strand includes only a single LED.

Case 1:

The current on-board power supply voltage $U\_BOARD=13.5$V. For this voltage three LEDs can be connected in series, so that $N\_CURRENT=3$. This means that the sum of all U LEDs is exactly 10.5 V. This is just below the current on-board power supply voltage of 13.5 V. In a linear driver, for an LED current $I\_LED$ the power loss incurred is:

$$dU\times I\_LED=3.0V\times I\_LED.$$

Case 2:

If the on-board power supply voltage is 16 volts, the value obtained per strand is $N\_CURRENT=4$. The sum of all $U\_LED$ is therefore exactly 14 V, which is also slightly below the current on-board power supply voltage of 16 volts. In a linear driver, the power loss incurred is then: $dU\times I\_LED=2.0V\times I\_LED.$ Case 3:

If the on-board power supply voltage $U\_BOARD$ is 9 V, this would give $N\_CURRENT=2$ for the number of LEDs in a strand. The sum of all $U\_LED$ is therefore exactly 7 V, which is again slightly below the current on-board power supply voltage of 9 V. In a linear driver, the power loss incurred is:

$$dU \times I\_LED = 2.0V \times I\_LED. \quad (5)$$

Typically, the current through an LED I_LED=1 A. But it can also have values such as 2.0 A, 0.5 A, 0.1 A or similar. In the case of I_LED=1 A the losses in the above three cases are in the region of 2 W or 3 W.

Figure 2:
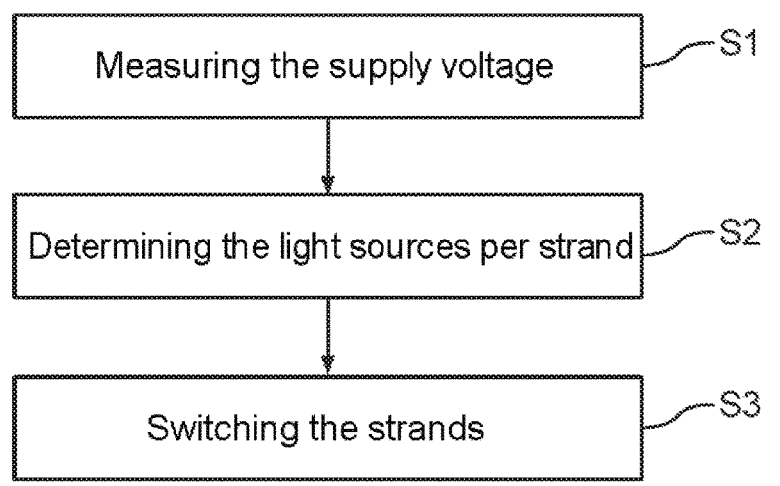
FIG. 2 a flowchart of a method according to the present disclosure for operating a lighting device.

FIG. 2 shows a schematic representation of the method sequence for switching the light sources. In a first step S1 the supply voltage (e.g. the on-board power supply voltage) of the lighting device is measured. In a subsequent step S2 the number of light sources is determined automatically in at least one of the strands and preferably in all segments. The resulting number of light sources per strand should be as nearly equal as possible. For (each of the) calculated numbers, the number must correspond to the largest whole number which, when multiplied by a specifiable forward voltage of each of the light sources, is less than the measured supply voltage. Thereafter, in a step S3 the exact number of light sources determined in a respective strand are connected in series.

By defining the ideal total number in accordance with point f) above, a lighting device can be realized in which all light sources (LEDs, laser diodes and the like) can be controlled uniformly for all voltage values of the on-board network or supply voltage. The control can be carried out in particular with a linear or resistance driver, in such a way as to minimize the power loss in the driver. Therefore, the use of linear or resistance drivers that are simple, robust and have low interference is possible at relatively high LED currents where only switching converters have previously been used.

This solution facilitates a very compact LED lighting device for dipped beam and main beam, which in the extreme case can be assembled in a single integrated housing. The potential savings can extend to a major part of the costs, the installation space, and the complexity of switching converter solutions.

While the disclosed embodiments have been particularly shown and described with reference to specific embodiments, it should be understood by those skilled in the art that various changes in form and detail may be made therein without departing from the spirit and scope of the disclosed embodiments as defined by the appended claims. The scope of the disclosed embodiments is thus indicated by the appended claims and all changes which come within the meaning and range of equivalency of the claims are therefore intended to be embraced.

The invention claimed is:

1. A method for operating a lighting device having multiple light sources, comprising:
   determining a measure of a supply voltage and
   switching of the light sources into one or more parallel strands, wherein the light sources in each strand are connected in series, in each case according to the measured value of the supply voltage,
   wherein
   automatic determination of a number of light sources in at least one of the strands, the number corresponding to the largest whole number which, when multiplied by a specifiable forward voltage of each of the light sources, is less than the measured value of the supply voltage, and wherein
   during switching of the light sources the exact number of light sources determined in the at least one strand is connected in series;
   wherein a minimum voltage value and a maximum voltage value are specified for the supply voltage, a minimum number of light sources is determined in at least one of the strands such that the minimum number corresponds to the largest whole number, which when multiplied by the specifiable forward voltage of each of the light sources is less than the minimum voltage value, and a maximum number of light sources is determined in at least one of the strands such that the maximum number corresponds to the largest whole number, which when multiplied by the specifiable forward voltage of each of the light sources is less than the maximum voltage value, and wherein a whole number between the minimum number and the maximum number is selected as the number of light sources.

2. The method as claimed in claim 1,
   wherein the forward voltage is specified or else measured at one or a plurality of the light sources.

3. The method as claimed in claim 1,
   wherein all parallel strands contain the same number of light sources in series.

4. The method as claimed in claim 1,
   wherein the total number of light sources of the lighting device corresponds to the ratio of factorial maximum number and factorial minimum number-1.

5. A lighting device comprising:
   a plurality of light sources,
   a determination device for determining a measure of a supply voltage and
   a switching device for switching the light sources into one or more parallel strands, wherein the light sources in each strand are connected in series, in each case according to the measured value of the supply voltage,
   wherein
   a control device for the automatic calculation of a number of light sources in at least one of the strands, the number corresponding to the largest whole number which, when multiplied by a specifiable forward voltage of each of the light sources, is less than the measured value of the supply voltage, wherein
   the switching device can be controlled by the control device in such a way that the exact number of light sources determined in the at least one strand is connected in series;
   wherein a minimum voltage value and a maximum voltage value are specified for the supply voltage, a minimum number of light sources in at least one of the strands corresponds to the largest whole number, which when multiplied by the specifiable forward voltage of each of the light sources is less than the minimum voltage value, and a maximum number of light sources in at least one of the strands corresponds to the largest whole number, which when multiplied by the specifiable forward voltage of each of the light sources is less than the maximum voltage value, and wherein a whole number between the minimum number and the maximum number comprises the number of light sources.

6. The lighting device as claimed in claim 5,
   which has a single linear driver or a single resistance driver for the electrical supply of all light sources.

7. The lighting device as claimed in claim 5,
   which has a separate linear driver or resistance driver for each strand for the electrical supply of the light sources.

8. The lighting device as claimed in claim 5, wherein the light sources are light emitting diodes or laser diodes or modules thereof.

9. A motor vehicle having a lighting device, the lighting device comprising:
a plurality of light sources,
a determination device for determining a measure of a supply voltage and
a switching device for switching the light sources into one or more parallel strands, wherein the light sources in each strand are connected in series, in each case according to the measured value of the supply voltage, wherein
a control device for the automatic calculation of a number of light sources in at least one of the strands, the number corresponding to the largest whole number which, when multiplied by a specifiable forward voltage of each of the light sources, is less than the measured value of the supply voltage, wherein
the switching device can be controlled by the control device in such a way that the exact number of light sources determined in the at least one strand is connected in series;
wherein a minimum voltage value and a maximum voltage value are specified for the supply voltage, a minimum number of light sources in at least one of the strands corresponds to the largest whole number, which when multiplied by the specifiable forward voltage of each of the light sources is less than the minimum voltage value, and a maximum number of light sources in at least one of the strands corresponds to the largest whole number, which when multiplied by the specifiable forward voltage of each of the light sources is less than the maximum voltage value, and wherein a whole number between the minimum number and the maximum number comprises the number of light sources.

10. The motor vehicle having the lighting device as claimed in claim 9, which has a single linear driver or a single resistance driver for the electrical supply of all light sources.

11. The motor vehicle having the lighting device as claimed in claim 9, which has a separate linear driver or resistance driver for each strand for the electrical supply of the light sources.

* * * * *